United States Patent [19]

Kobler et al.

[11] 3,728,494

[45] Apr. 17, 1973

[54] SIGNAL CONTROL SYSTEM FOR ENDLESS TAPE RECORDER

[75] Inventors: Richard Kobler, CH 6300 Zug, Switzerland; William F. Fagan, Rochelle Park, N.J.

[73] Assignee: McGraw-Hill Company, Elgin, Ill.

[22] Filed: Nov. 15, 1971

[21] Appl. No.: 198,874

[52] U.S. Cl. ................ 179/100.2 S, 179/100.1 DR, 179/100.2 MD

[51] Int. Cl. ........................ G11b 15/02, G11b 15/12

[58] Field of Search .......... 179/100.1 DR, 100.2 MD, 179/6 E, 100.2 S

[56] References Cited

UNITED STATES PATENTS

| | | | |
|---|---|---|---|
| 3,511,935 | 5/1970 | Mizuno | 179/6 E |
| 3,467,791 | 9/1969 | Bolick, Jr. | 179/100.1 DR |
| 3,467,790 | 9/1969 | Bolick, Jr. | 179/100.1 DR |

*Primary Examiner*—J. Russell Goudeau
*Attorney*—George H. Fritzinger

[57] ABSTRACT

A dictating machine using an endless magnetic tape records a control signal alongside the audio track only during the recording of dictation, and forms an erased section in advance of the last recording when a playback control is depressed to listen back to a portion of the recording and when the operator hangs up the microphone denoting the end of his use of the machine. A control signal detector allows the operator to rewind only to the beginning of his dictation assuring privacy to each user, and shifts the machine automatically into recording when he advances the tape to the prior position of farthest advance. Fast rewind and/or fast forward drive of the tape are possible only when the machine is in playback or when the operator hangs up the microphone. Either loss of control signal or release of a manual playback control stops the rewind and starts a normal advance of the machine in playback condition, which then continues until the forward mark — i.e., erased section — is reached. However, if the user presses the manual record control during playback the tape is moved fast forward until the forward mark is reached and the machine is then shifted automatically into normal record condition. Various safety controls and timing circuits assure a well-nigh automatic and error-free use of the machine.

17 Claims, 2 Drawing Figures

INVENTORS
RICHARD KOBLER
WILLIAM F. FAGAN
BY
George H. Fritzinger
AGENT

PATENTED APR 17 1973 3,728,494

INVENTORS
RICHARD KOBLER
WILLIAM F. FAGAN
BY
George H. Fritzinger
AGENT

SIGNAL CONTROL SYSTEM FOR ENDLESS TAPE RECORDER

This invention applies especially to the endless magnetic tape recorder described in our application Ser. No. 122,349, filed Mar. 9, 1971 and entitled ENDLESS LOOP TAPE RECORDER, and issued Oct. 17, 1972 as U.S. Pat. No. 3,698,723.

Objects of the invention are to provide a control signal in a control track alongside the recorded audio track with control means to provide erased sections serving as a mark denoting the end of recording when playback is initiated and the end of recording when a user hangs up the microphone indicating his end of the use of the machine. Further, it is an object to provide detecting means to prevent rewinding the tape past such mark so as to assure privacy to each user and to shift the machine automatically into record during a forward drive in playback to the prior point of farthest advance so as to assure an error-free use of the machine and full utilization of the tape.

Other objects are to provide an improved design for carrying out the aforestated objectives, and in providing a dependable and economical control apparatus and circuitry for the purposes stated.

These and other objects and features of the invention will be apparent from the following description and the appended claims.

Figure 1:
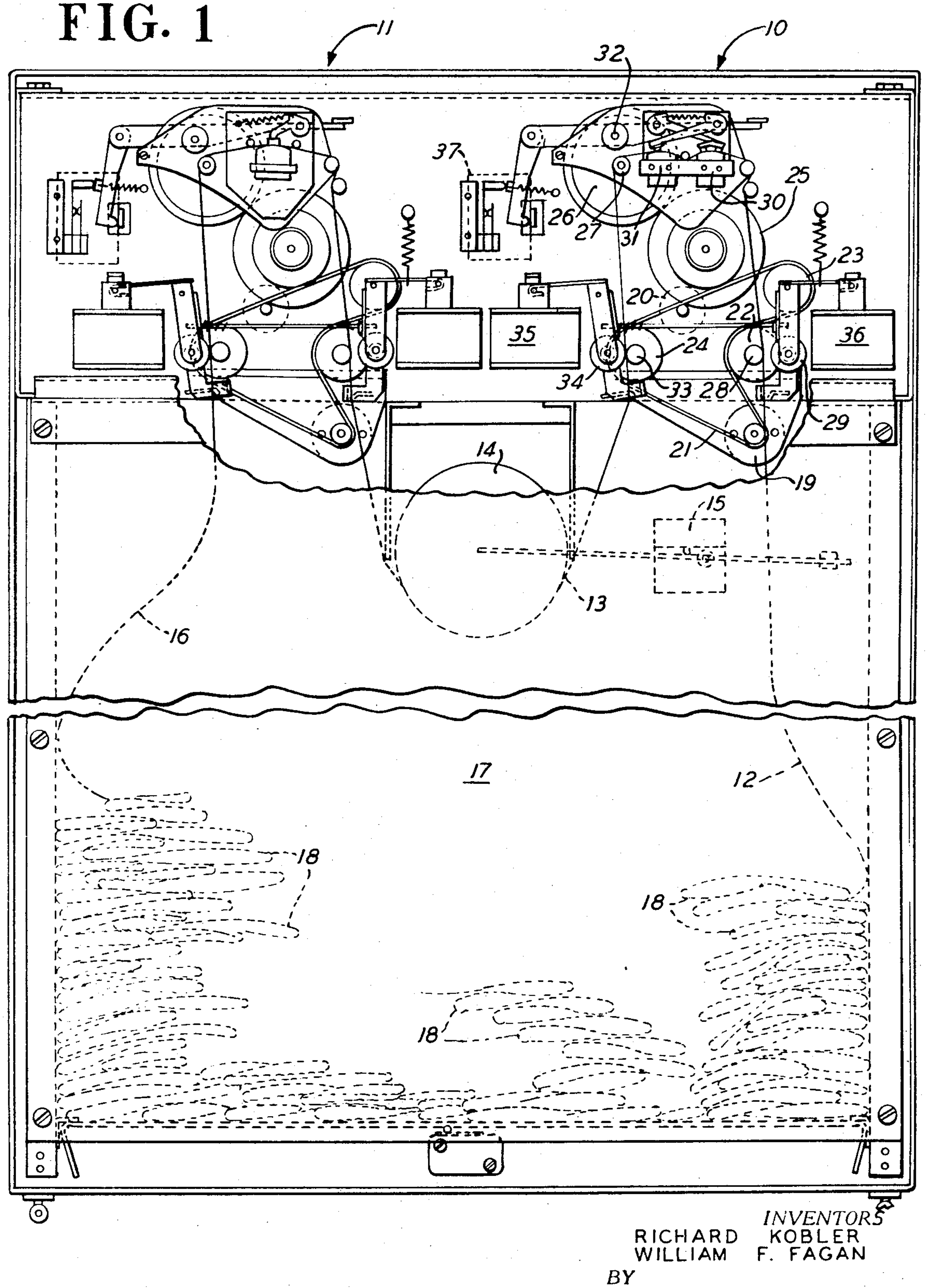
Figure 2:
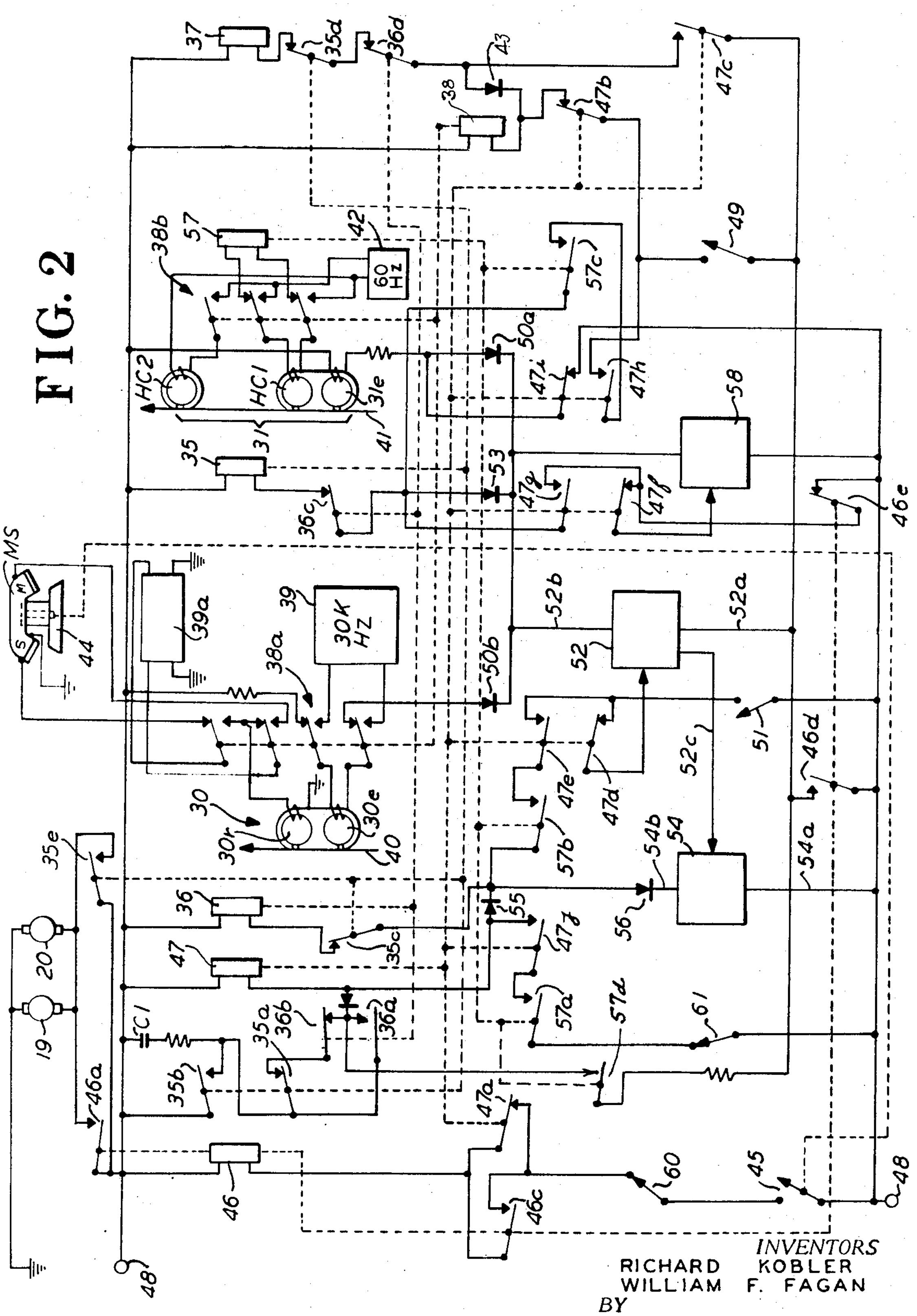

In the description of our invention reference is had to the accompanying drawings, of which:

FIG. 1 is a front elevational view with the side cover removed showing an endless tape recorder to which the invention pertains; and FIG. 2 is a block circuit diagram of the control system of the tape recorder.

The endless tape recorder shown in FIG. 1 comprises recording and dictating units 10 and 11 each including drive and scan motors and suitable tape engaging heads. Reference may be had to the aforementioned pending application as to details of construction of this recorder-reproducer mechanism. The present invention pertains to the control apparatus and circuitry of the recorder unit which permits the user to listen back easily to his prior dictation wherein the control medium is a control signal recorded alongside the audio track during the recording of dictation. For the present purposes a brief description of the apparatus of only the recorder unit will suffice.

As shown in FIG. 1 the tape 12 is led through the recording unit from right to left and then downwardly and across via an inner run 13 around a lift member 14 of a control switch 15 to the right side of a transcribing unit 11. From the transcribing unit the tape leads downwardly via an outer run 16 to a storage bin 17 of a narrow width to confine the tape in loops 18 folded back and forth on themselves. Only by way of example, the excess tape is shown as being wholly constituted in the outer run.

The recording unit comprises a fast drive scan motor 19 and a normal drive record motor 20. The scan motor 19 drives a belt 21 trained around a rewind pulley 22, an idler pulley 23 and a fast-forward pulley 24 back to the motor. The normal drive motor 20 has a drive shaft frictionally engaging a drive wheel 25 which in turn frictionally engages a normal drive wheel 26 having thereon a friction wheel 27 engaging the tape. The tape is led from the bin 17 upwardly into the right end of the recorder unit between a friction wheel 28 on the rewind pulley 22 and a pinch roller 29, then across audio and control heads 30 and 31, next around the normal-drive friction wheel 27 between this wheel and a cooperating pinch roller 32 and then downwardly between a frictional wheel 33 on the fast-forward pulley 24 and a pinch roller 34. The pinch roller 34 is engageable with the friction wheel 33 for fast-forward scan by energizing a solenoid 35, and the pinch roller 29 is engageable with the friction wheel 28 for fast rewind by energizing a solenoid 36. When both solenoids 35 and 36 are disengaged the pinch roller 32 is engageable with the friction wheel 27 to provide normal forward drive of the tape by energizing a solenoid 37.

The recording equipment includes a microphone-speaker unit MS (FIG. 2) coupled via a section 38*a* of a record-playback electromagnet 38 to a bias oscillator 39 and an amplifier 39*a* to permit the dictator to record on an audio track 40 of the tape 12 and to listen back thereto at will. Alongside the audio track is a control signal track 41 on which a 60 cycle signal is recorded from a source 42 controlled by a switch section 38*b* of the record-reproduce relay 38. A cradle or hanger 44 is provided to support the microphone when the recorder unit is not in use. Associated with this cradle is an on-off switch 45, oft referred to as a hook switch, which is opened by the weight of the microphone as it is placed in the cradle. Closure of the switch 45 as the microphone is lifted from the cradle activates a sieze relay 46 from a power source indicated by a pair of terminals 48. The sieze relay has a pair of contacts 46*a* to start the scan and drive motors 19 and 20 when the microphone is picked up.

If the user closes a manual record switch 49, the power source 48 is connected via the sieze relay contacts 46*d*, record switch 49 and the normally closed contacts 47*b* of a playback relay 47 to operate the record-playback relay 38 from its normal playback position into its record position. This operates the switch section 38*a* to apply 30K Hz to bias winding 30*e* of the record head 30 and it connects the output of the amplifier 39*a* to the record winding 30*r* of the record head 30. At the same time, the switch section 38*b* applies 60 Hz to record windings HC1 and HC2 of control head 31. Also, the closing of the manual record switch 49 energized the normal drive relay 37 via the normally closed contacts 47*b* of the playback relay 47, diode 43 and normally closed contacts 35*d* and 36*d* of the fast-forward and rewind relays 35 and 36 to engage the pinch roller 32 and start normal forward drive of the tape. Further, as the sieze relay 46 was operated it closed its *c* contacts across the switch 47*a* and it closed its *d* contacts to connect the control system to the power source 48. Thus, an audio signal as now recorded on the audio track 40 and a 60 Hz control signal is recorded on the control track 41. As the recording takes place the control track is dc erased at a short distance ahead of the record head by the head section 31*e* energized via the normally closed contacts 47*i* of the playback relay. Since the control signal applied by the winding HC2 could be opposed by the winding HC1, the latter is made able to over-record the other.

If the user releases the record switch 49, the record-playback relay 38 is returned to playback position and the record drive relay 37 is dropped to stop the machine in playback condition.

If the user wants to quick review a last portion of his recording he momentarily closes a manual playback switch 51 to trigger a multivibrator 52 via the switch **47*d* causing it to interconnect the leads 52*a* and 52*b* for a period of about 175 ms. This causes the fast-forward relay 35 to be operated from the power source 48 via the sieze switch 46*d*, lead 52*a*, multivibrator 52, lead 52*b*, diode 53 and rewind switch 36*c*. The fast-forward relay opens the switch 35*c* to disable the rewind relay 36 and it opens the switch 35*d* to disable the normal drive relay 37. Further, the fast-forward relay engages the pinch roller 29 to start a fast-forward scan of the tape for a 175 ms. and thus jog the tape ahead about 2.5 inches. During this forward jog the head sections 30*e* and 31*e* are energized via the multivibrator 52 to apply dc erase to both the audio track 40 and control track 41** whereby to provide an erased section of the tape to form a forward mark.

The end of the forward mark occurs when the multivibrator 52 drops out at the end of the 175 ms. interval to deenergize the fast-forward relay 35 and thereby stop the tape. The dropping of the multivibrator 52 also deenergizes the head sections **30*e* and 31*e* to remove dc erase from the audio track 40 and the control track 41, and it triggers the multivibrator 54 via lead 52*c* to interconnect leads 54*a* and 54*b* for a period of 350 ms. During this 350 ms. interval the playback relay 47 is energized from the terminals 48 via the diodes 55 and 56 and multivibrator 54 and the rewind relay 36 is then energized via switch 35*c*, diode 56 and multivibrator 54. The operation of the playback relay 47 enables a number of other operations to occur: i.e., (1) it closes switch 47*j* to enable the playback relay 47 to be held operated after the multivibrator 54 drops out in response to operation of a signal relay 57 itself operated by pickup of control signal from the control track 41 during playback after drop out of the sieze relay 46; (2) it opens switch 47*d* to disable the multivibrator 52 which in turn deenergizes the head section 31*e* to prevent erase of the control signal; and (3) it closes switch 47*e* to permit playback switch 51 to control rewind relay 36, closes switch 47*h* to enable record switch 49 to control fast-forward relay 35, closes switch 47*c* to enable normal drive relay 37 to be operated when the sieze relay 46 is operated and it closes switch 47*g* to enable hangup (opening of switch 45) to run out the tape by the operation of fast-forward relay 35 via switches 47*g* and 46*e*. The above-mentioned operation of rewind relay 36 engages the pinch roller 29 to start fast rewind of the tape, opens switch 36*d* to disable normal forward drive, opens switch 36*c* to prevent operation of fast-forward relay 35 and it closes switch 36*a* to enable charging of capacitor C1 via switch 57*d* since SR relay 57 is now held operated by pickup of signal from the control signal track. Further, the closure of switch 57*d* completes a circuit to keep the playback relay 47 operated during playback while the sieze relay 46** is operated.

During the 350 ms. interval of the multivibrator 54, the tape is rewound about 5 inches — which is about 2½ inches back onto the recording — and thereupon the rewind relay 36 is dropped out to stop the tape. However, the drop out of the rewind relay 36 closed switch **36*d* to operate the normal drive relay 37 whereby to engage the pinch roller 32** and start a normal forward drive of the tape.

The signal relay 57 was dropped momentarily by the reversal in the drive of the tape but condenser C1 was discharged through the playback relay 47, by reason of the opening of the charge circuit at switch **57*d* and a closure of switch 36*b*, to keep the playback relay operated during this momentary reversal in the drive of the tape. Further, the dropping of the rewind relay closed switch 36*c* to enable the fast-forward relay 35 to be later operated. The energization of the normal drive relay 37 starts normal forward advance of the tape providing the quick review — i.e., a playback of the last few words. The SR relay 57 is again operated by pickup of the control signal during this normal forward advance of the tape to close the switch 57*a* and restore the holding circuit for the playback relay 47 and to close switch 57*d* to again charge the condenser C1. Playback now continues until the forward erase mark is reached at which time the SR relay 57 is dropped out. This drop out opens the switch 57*a* to drop out the playback relay 47 and it opens switch 57*d* to disconnect the charge circuit for the condenser C1 the effect of which is to cause the condenser C1 to be discharged through the playback relay via switches 35*a* and 36*b* to delay the drop out of the playback relay. Further, the dropping out of the signal relay 57 opens switch 57*b* to disable the rewind relay 36 and it opens switch 57*c* to disable the fast-forward relay 35. The drop out of the playback relay 47 opens the switch 47*c* to drop out the normal drive relay 37 and bring the tape to a stop. However, the delayed drop out of the relay 47** by the discharge of the condenser C1 caused the tape to move beyond the point where the playback started to provide an erased safety gap on both tracks of the tape.

If when the tape is returned to the forward mark the user closes the record switch 49, the record cycle is repeated. However, the head section HC2 will record 60 cycle over the erased section left on the control track when the playback was terminated to enable subsequent playback over this section of the control track. If the user again recloses the playback switch 51, the playback cycle is repeated as above-described.

A number of special situations may occur depending on whether the user presses the record or playback switches before playback is completed to the point of farthest advance along the tape:

(1) If he closes the playback switch 51 during playback this will reenergize the rewind relay 36 to open switch **36*d* and disable the normal drive relay 37, close switch 36*a* to recharge condenser C1, open switch 36*c* to disable the fast-forward relay 35 and to engage pinch roller 29 to start rewind of the tape and cause the signal relay 57 to be energized by pickup of the control signal. If the playback switch 51 is held operated until the rear mark (erased section) is reached, the SR relay 57 drops out at that instant opening the switch 57*b* to drop the rewind relay 36** and to stop the rewind of the tape.

(2) If the user releases the playback switch to open position before the rear mark is reached, the rewind relay 36 is dropped to stop rewind of the tape and the switch 36*d* is closed to energize the normal drive relay 37 and start the normal forward advance of the tape, but before the tape advance is started the SR relay 57 is momentarily deenergized to cause the condenser C1 to discharge through the playback relay 47 and hold the relay operated during the reversal of the drive. Upon resumption of the tape drive in the forward direction the SR relay 57 is again energized to close the switch 57*d* whereby to again recharge the condenser C1.

(3) If the user recloses the playback switch 51 during playback and holds it closed until the rear mark is reached, there first occurs the same sequence of operations as is described above in condition (1), and when the tape rewinds to the rear mark the SR relay 57 is dropped momentarily to provide the same sequence of operations as when the playback switch 51 was released as described in condition (2). Note though that the playback switch 51 must be released when the rear mark is reached or else a recycling will occur at this point.

(4) If the user closes the record switch 49 during playback, the fast-forward relay 35 is operated to open switch 35*d* to disable the normal drive relay 37 and to open switch 35*c* to disable the rewind relay 36, and further, the fast-forward relay engages the pinch roller 34 to start a fast-forward drive of the tape.

(5) If the user opens the record switch 49 before the forward mark is reached, the fast-forward relay 35 is dropped to stop the fast-forward drive of the tape and the switch 35*d* is closed to start normal forward drive of the tape in reproduce condition. Note that as the tape was momentarily stopped during the shift of the drive from fast-forward to normal forward drive the SR relay 57 was momentarily deenergized but the condenser C1 was discharged through the playback relay 47 to maintain it operated during the reversal in the drive of the tape.

(6) If the user continues to hold the record switch 49 closed the condenser C1 is charged and the SR relay 57 is dropped out when the forward mark is reached. This opens switch 57*a* to disable the holding circuit for the playback relay 47 but the condenser C1 discharges through the playback relay 47 at that instant to delay its dropout until the tape has passed all its recording; thereupon the playback relay 47 is dropped out to open the switch 47*b* to deenergize the normal drive relay 37 and to apply *dc* erase to the head winding HC1 by the closure of switch 47*i*. However, if the user continues to hold the record switch closed after the forward marker is reached, the normal drive relay 37 is immediately reenergized to resume the normal forward drive of the tape and the record playback relay 38 is operated to shift the machine into recording operation.

Upon placing the microphone back into the cradle to open the hook switch 45 while the machine is in playback, the sieze relay 46 is deenergized to open switch 46*d* and drop out the normal drive relay 37. However, the playback relay 47 is kept energized via its hold circuit through its contact 47*j* and signal relay contact 57*a* and with dropout of the sieze relay closing contacts 46*e* the fast-forward relay 35 is energized. Although the contacts 46*a* of the sieze relay are now open, the drive motors are kept running via the parallel contacts 35*e* of the fast-forward relay. When the forward mark is reached the SR relay 57 drops out to open switch 57*a* and deenergize the playback relay. This closes the switch 47*f*, which with switch 46*e* now being closed, triggers the multivibrator 58 for an interval of 1.5 seconds. The multivibrator 58 reactivates the fast-forward relay 35 which in turn recloses switch 35*e* to keep the drive motors running, and it applies dc erase to both heads 30 and 31 during this interval causing a continuation of advance of the tape with erase of both audio track 40 and control track 41 for a distance of about 22 inches. This is the normal distance between the heads of the record station and the heads of the reproduce station. Thus, the entire part of the recording last dictated becomes available to the secretary for transcription before the tape is stopped.

If the user operates the switch 60 momentarily to make a length mark, the operation is the same as during the return of the microphone to the cradle except that the circuit will be again siezed after the forward scan is completed.

If the user presses the length mark switch 60 while the machine is siezed but not in recording or reproducing, the multivibrator 58 is triggered by closing of the sieze switch 46*e* to produce a fast-forward advance of about 22 inches distance with the erase of both audio and control tracks as before-described.

If the user operates the correct switch 61 while the machine is not in playback or while the machine is in record there is no effect. Operation of the correct switch while in playback drops out the playback relay 47 to deenergize the normal drive relay 37 and stop the tape. Any recording after operating the correct switch 61 cannot be retrieved. In other words, this is an "erase correct" operation requiring redictation of any subsequent material or any recorded on the record beyond the point where the correct operation was made.

The embodiment of our invention herein particularly shown and described is intended to be illustrative and not necessarily limitative of our invention since the same is subject to changes and modifications without departure from the scope of our invention, which we endeavor to express according to the following claims.

We claim:

1. In a machine for recording dictation and for selectively listening back thereto: the combination of a magnetic tape having parallel audio and control signal tracks therealong, an audio head for recording dictation on and for erasing the same from said audio track, a control signal head for recording a control signal on and for erasing the same from said control signal track, tape drive means, a speaker-microphone, a control signal source, a control signal relay operable to maintain a machine in selected operated conditions as long as said relay is held operated by signals picked up from the tape by said control signal head, a record-reproduce circuitry operable into record position to connect said microphone to said audio head and concurrently said signal source to said control signal head, and into reproduce position to connect said audio head to said speaker and said control signal head to said control signal relay, a manual record control operable to condition said drive means to advance the tape at normal speed and concurrently to shift said record-reproduce circuitry into record position, and a manual playback control operable to advance said tape for a predetermined interval and concurrently to feed erase signals to both said heads to provide an erased section on both tracks forming a forward mark, thereupon to backfeed the tape at above normal speed without applying signals to either head, and then to advance the tape at normal speed while placing said record-reproduce circuitry in reproduce condition.

2. In a machine for recording dictation and for selectively listening back thereto: the combination of a magnetic tape, audio and control heads for engaging said tape along respective parallel audio and control tracks, a tape drive means, shiftable record-reproduce means for conditioning said machine selectively for recording and for playback, a manual record control operable to start said drive means and to shift said record-reproduce means into record condition for recording dictation on said audio track, means responsive to operation of said manual record control for recording a control signal on said control track concurrently as the tape is moved to record dictation on said audio track, a manual playback control, and means responsive to operating said playback control for first advancing the tape a predetermined distance while applying erase signals to both of said heads, then backfeeding the tape a selected distance without applying any signals to said heads, and next shifting the machine into reproduce condition and advancing the tape at normal drive speed whereby an erased track section is provided on both the audio and control tracks of said tape beyond the point of farthest advance in recording forming a forward mark and then a selected portion of the recorded dictation is played back.

3. The dictating machine set forth in claim 2 including means for detecting said control signal for maintaining the machine in operating condition after operation of said playback control until an absence of signal is detected on said control track.

4. The dictating machine set forth in claim 3 including delay means associated with said detecting means for continuing an advance of the tape a predetermined interval after an absence of control signal is detected whereby a portion of said erased section designating said forward mark is moved past the heads of the machine before the tape is stopped.

5. The dictating machine set forth in claim 4 including a second control head spaced from said first mentioned control head for applying a control signal over said portion of said erased section upon the tape being next advanced with the machine in recording condition.

6. The dictating machine set forth in claim 2 including means for conditioning said tape drive means to advance and backfeed the tape selectively at above-normal speed, a playback relay energized by operation of said manual playback control, and means controlled by said playback relay to render said drive means operable in fast forward and fast backfeed when said relay is operated.

7. The dictating machine set forth in claim 6 including a control signal detecting means, an on-off switch for said machine cooperable with said signal detecting means to cause the tape to be driven in fast-forward to a point where an absence of signal is detected in said control track when said on-off switch is returned to off position, and timing means activated by said signal detecting means when said absence of control signal is detected for reactivating said drive means in fast-forward for a predetermined interval and for concurrently feeding erase current to both said audio and control heads during the reactivation of said driving means.

8. The dictating machine set forth in claim 3 wherein said detecting means includes a control signal relay operated by signal picked up from said control track, a playback relay having a hold circuit controlled by said control signal relay for holding the playback relay energized so long as said control signal relay is held operated, means for maintaining said machine in operating playback condition so long as said playback relay is operated, and means for delaying drop out of said playback relay for an interval after drop out of said control signal relay whereby to produce an erased section on each track following the point where the recording last ended.

9. The dictating machine set forth in claim 8 including a rewind relay operable to back feed said tape at above-normal speed and a fast-forward relay operable to advance said tape at above-normal speed, and means for disabling both said rewind and fast-forward relays when said control signal relay is dropped out.

10. The dictating machine set forth in claim 8 wherein said control signal head includes a second head section positioned in rear of the first section energized by said control signal relay when the machine is in record condition for recording a control signal over the erased section of the control track left on the control track when said playback relay was dropped out.

11. The dictating machine set forth in claim 9 including a normal forward relay causing said tape to be advanced at normal speed when the normal forward relay is operated, means responsive to closing said manual playback control while the machine is in playback for operating said rewind relay during the time said playback control is held operated and said signal control relay is operated, and means responsive to operation of said rewind relay for disabling said normal forward and fast-forward relays.

12. The dictating machine set forth in claim 11 wherein the tape is returned to normal forward drive when said playback control is released, including means to maintain said playback relay operated during the reversal of the drive of the tape from fast rewind to normal forward drive.

13. The dictating machine set forth in claim 9 including a capacitor effective upon discharge through said playback relay to produce said delay in the drop out of the playback relay, a charge circuit for said capacitor enabled by operation of said rewind relay and by drop out of both said fast-forward and rewind relays, and means for completing said charge circuit by operation of said control signal relay.

14. The dictating machine set forth in claim 13 including a discharge circuit for said capacitor through said playback relay enabled by drop out of said control signal relay, and means for completing said discharge circuit by operation of said rewind relay and by a concurrent drop out of both said rewind relay and of said fast-forward relay.

15. The dictating machine set forth in claim 9 including means responsive to drop out of said signal control relay when an erased space is reached for dropping out said rewind relay to stop the reverse drive of the tape, means controlled by said rewind relay to restart the drive of the tape in a forward direction when said rewind relay is dropped out and before said playback relay is dropped out, and means responsive to reactivation of said control signal relay during the forward advance of the tape for maintaining said playback relay operated.

16. The dictating machine set forth in claim 9 including a normal forward relay for causing the tape to be advanced at normal speed when the relay is operated, means responsive to operating said manual record control while the machine is in playback for operating said fast-forward relay to advance the tape at fast speed, means responsive to holding said manual record control operated when said forward erased marker section is reached for producing a delayed drop out of said playback relay, and means responsive to drop out of said playback relay for operating said normal forward relay to start advance of the tape at normal speed and for concurrently shifting said machine into record condition.

17. The dictating machine set forth in claim 9 including an adjacent transcribing station cooperating with the tape, an on-off station switch, means responsive to shifting said on-off switch to off position while the machine is in playback condition for operating said fast-forward relay to advance the tape at fast speed while holding the playback relay operated until the forward erase marker space is reached, a multivibrator, means responsive to drop out of said playback relay when said marker section is reached for triggering said multivibrator for a preset interval, and circuit means operative while said multivibrator is triggered for applying dc erase current to both of said heads and for maintaining said fast-forward relay operated for said predetermined interval to provide an erased space along the tape of a length equal to the length of the tape from said recorder heads to said transcribing station.

* * * * *